(12) United States Patent
Ku et al.

(10) Patent No.: US 12,195,078 B2
(45) Date of Patent: Jan. 14, 2025

(54) VEHICLE STEERING COLUMN

(71) Applicant: HL MANDO CORPORATION, Pyeongtaek (KR)

(72) Inventors: Sangchul Ku, Seoul (KR); Sunghun Park, Anyang (KR); Jeongrae Kim, Seoul (KR); Sungjune Moon, Seoul (KR); Taeho Kim, Suwon (KR)

(73) Assignee: HL MANDO CORPORATION, Pyeongtaek (KR)

( * ) Notice: Subject to any disclaimer, the term of this patent is extended or adjusted under 35 U.S.C. 154(b) by 0 days.

(21) Appl. No.: 18/500,125

(22) Filed: Nov. 2, 2023

(65) Prior Publication Data

US 2024/0317297 A1  Sep. 26, 2024

(30) Foreign Application Priority Data

Mar. 24, 2023 (KR) .................. 10-2023-0038719

(51) Int. Cl.
*B62D 1/181* (2006.01)
*B62D 1/183* (2006.01)
*B62D 1/185* (2006.01)
*B62D 1/187* (2006.01)

(52) U.S. Cl.
CPC ............ *B62D 1/187* (2013.01); *B62D 1/181* (2013.01); *B62D 1/183* (2013.01); *B62D 1/185* (2013.01)

(58) Field of Classification Search
CPC .......... B62D 1/18; B62D 1/181; B62D 1/183; B62D 1/185; B62D 1/187; B62D 1/189
USPC .............................................. 74/493; 280/775
See application file for complete search history.

(56) References Cited

U.S. PATENT DOCUMENTS

| | | | |
|---|---|---|---|
| 2021/0403076 A1* | 12/2021 | Edamoto | B62D 1/183 |
| 2023/0311972 A1* | 10/2023 | Caverly | B62D 5/005 |
| 2023/0331283 A1* | 10/2023 | Caverly | B62D 5/006 |
| 2024/0017762 A1* | 1/2024 | Caverly | B62D 1/189 |

FOREIGN PATENT DOCUMENTS

| | | | | |
|---|---|---|---|---|
| DE | 102019209680 A1 | * | 1/2020 | |
| JP | 2020172205 A | * | 10/2020 | |
| WO | WO-2024051384 A1 | * | 3/2024 | ............. B62D 1/187 |

* cited by examiner

*Primary Examiner* — Keith J Frisby
(74) *Attorney, Agent, or Firm* — Harvest IP Law, LLP

(57) ABSTRACT

The present embodiments provide a vehicle steering column that may more quickly and stably perform telescoping for adjusting the axial length of the steering column and stowing for drawing the steering wheel into or out of the dashboard, secure a convenient space for the driver, and provide safety and convenience to the driver.

20 Claims, 14 Drawing Sheets

VEHICLE STEERING COLUMN

CROSS-REFERENCE TO RELATED APPLICATION

This application claims priority from Korean Patent Application No. 10-2023-0038719, filed on Mar. 24, 2023, which is hereby incorporated by reference for all purposes as if fully set forth herein.

BACKGROUND

Field

The present embodiments relate to a vehicle steering column and, more specifically, to a vehicle steering column that may more quickly and stably perform telescoping for adjusting the axial length of the steering column and stowing for drawing the steering wheel into or out of the dashboard, secure a convenient space for the driver, and provide safety and convenience to the driver.

Description of Related Art

In general, the steering column for a vehicle comes with telescoping and tilting features by which the driver may adjust the protrusion and tilt angle of the steering wheel to suit his height or body shape to enable smooth steering.

Recent steer-by-wire (SBW) steering devices achieve vehicle steering using an electric motor, instead of components for mechanically linking components, such as universal joint or pinion shaft, between the steering wheel and the wheels.

The development of steer-by-wire steering devices leads to the development of steering columns capable of self-driving that transports the driver to the destination even without the driver's manipulation of the acceleration pedal or brake. This has generated a demand for securing a spacious room for the driver's convenience during self-driving.

To that end, a research effort is being made to increase the telescoping-in or out distance of the steering shaft or increase the stowing distance for drawing the steering wheel into or out of the dashboard.

In the conventional vehicle steering column, however, an increase in drawing-in/out distance results in slowdown of telescoping and excessive loads on the motor, screw bar, and screw nut, which may deteriorate safety and convenience for the driver and components.

Accordingly, a need arises for research for a vehicle steering column capable of securing the driver's safety and convenience as well as stable and rapid operations even when the drawing-in/out distance of the vehicle steering column is increased.

BRIEF SUMMARY

Conceived in the foregoing background, the present embodiments relate to a vehicle steering column that may more quickly and stably perform telescoping for adjusting the axial length of the vehicle steering column and stowing for drawing the steering wheel into or out of the dashboard.

Further, the present embodiments relate to a vehicle steering column capable of securing a space while drawing in/out the vehicle steering column and the steering wheel, providing a convenient space for the driver by increasing the drawing-in/out length, and quickly and stably performing drawing-in/out operation to provide convenience to the driver.

According to the present embodiments, there may be provided a vehicle steering column comprising a first moving member slidably coupled to a mounting bracket to be axially moved by a first actuator while being supported on the mounting bracket, a tilt bracket having a first side end rotatably coupled to the first moving member and a second side end rotatably coupled to an intermediate member, a second moving member having an inner side rotatably coupled with a steering shaft and an outer side slidably coupled with the intermediate member to be axially moved by a second actuator while being supported on the intermediate member, and a first position sensor provided on the intermediate member and the second moving member to detect an axial position of the steering shaft and the second moving member with respect to the intermediate member.

In the present embodiments, the first position sensor may include a first magnet assembly including a housing cover having a seating surface seated on an outer circumferential surface of the second moving member, a first magnet housing coupled to the housing cover, and a first magnet coupled to the first magnet housing and a first sensor assembly provided on the intermediate member to detect a change in a magnetic field of the first magnet.

In the present embodiments, the first magnet housing may include a first body having a fastening hole to which the housing cover is coupled and a first magnet insertion portion formed as a barrier rib protruding from one side surface of the first body to allow the first magnet to be inserted therein and having a first magnet support protruding to an inner surface of the barrier rib to support a side surface of the first magnet.

In the present embodiments, a lower end portion of the first magnet support may be connected to the first body, and two opposite sides of the first magnet support may be cut and spaced apart from the first magnet insertion portion.

In the present embodiments, the first sensor assembly may include a first printed circuit board on which a first sensor is mounted to detect a change in a magnetic field of the first magnet, a first board fixing member allowing the first printed circuit board to be mounted thereon and seated on a stepped portion around a through hole provided in the intermediate member, and a first sensor housing coupled to the stepped portion while surrounding the first board fixing member and a first terminal portion coupled to the first printed circuit board.

In the present embodiments, the vehicle steering column may further comprise a second position sensor provided on the mounting bracket and the first moving member to detect an axial position of the first moving member with respect to the mounting bracket.

In the present embodiments, the second position sensor may include a second magnet assembly including a second magnet housing inserted and fixed in a fixing recess provided in an inner surface of the mounting bracket and a second magnet coupled to the second magnet housing and a second sensor assembly provided on an outer surface of the first moving member to detect a change in a magnetic field of the second magnet.

In the present embodiments, the second magnet housing may include a second body coupled to the fixing recess of the mounting bracket and a second magnet insertion portion formed as a barrier rib protruding from one side surface of the second body to allow the second magnet to be inserted therein and having a second magnet support protruding to an inner surface of the barrier rib to support a side surface of the second magnet.

In the present embodiments, a lower end portion of the second magnet support may be connected to the second body, and two opposite sides of the second magnet support may be cut and spaced apart from the second magnet insertion portion.

In the present embodiments, the second sensor assembly may include a second printed circuit board on which a second sensor is mounted to detect a change in a magnetic field of the second magnet, a second board fixing member allowing the second printed circuit board to be mounted thereon and seated on a sensor mounting portion provided in the first moving member, and a second sensor housing coupled to the sensor mounting portion while surrounding the second board fixing member and a second terminal portion coupled to the second printed circuit board.

In the present embodiments, the vehicle steering column may further comprise a tilt rotational angle sensor provided in the first moving member and the intermediate member to detect a tilt angle of the intermediate member with respect to the first moving member.

In the present embodiments, the tilt rotational angle sensor may include a lever assembly provided in the intermediate member and a rotational angle sensor assembly provided on the first moving member to detect a rotational angle of the lever assembly.

In the present embodiments, the lever assembly may include a protruding member protruding from an outer surface of the intermediate member and a supporting lever having a first support rotatably coupled to the protruding member on a first side end and a second support rotatably coupled to the rotational angle sensor assembly on a second side end.

In the present embodiments, the rotational angle sensor assembly may include a rotating member coupled to the second support to rotate, a printed circuit board on which a sensor for detecting a rotational angle of the rotating member is mounted, a board fixing member on which the printed circuit board is mounted, and a sensor housing coupled to the first moving member while surrounding the board fixing member and a terminal portion coupled to the printed circuit board.

According to the present embodiments, there may be provided a vehicle steering column comprising a first moving member slidably coupled to a mounting bracket to be axially moved by a first actuator while being supported on the mounting bracket, a tilt bracket having a first side end rotatably coupled to the first moving member and a second side end rotatably coupled to an intermediate member, a second moving member having an inner side rotatably coupled with a steering shaft and an outer side slidably coupled with the intermediate member to be axially moved by a second actuator while being supported on the intermediate member, a first position sensor provided on the intermediate member and the second moving member to detect an axial position of the steering shaft and the second moving member with respect to the intermediate member, a second position sensor provided on the mounting bracket and the first moving member to detect an axial position of the first moving member with respect to the mounting bracket, and an electronic control unit controlling operation of the first actuator and the second actuator according to a draw-in signal value or a draw-out signal value of a draw-in/out switch manipulated by a driver and a position value received from the first position sensor and the second position sensor.

In the present embodiments, the first actuator may include a first motor and a first current sensor detecting an amount of current of the first motor, and the second actuator may include a second motor and a second current sensor detecting an amount of current of the second motor.

In the present embodiments, the electronic control unit may stop operation of the first motor and operates the second motor in a direction of drawing out the second moving member if the amount of current of the first motor detected by the first current sensor is greater than preset data when the draw-in signal value is received from the draw-in/out switch.

In the present embodiments, the electronic control unit may stop operation of the second motor and operates the first motor in a direction of drawing out the first moving member if the amount of current of the second motor detected by the second current sensor is greater than preset data when the draw-in signal value is received from the draw-in/out switch.

In the present embodiments, the electronic control unit may stop operation of the first motor and operates the second motor in a direction of drawing in the second moving member if the amount of current of the first motor detected by the first current sensor is greater than preset data when the draw-out signal value is received from the draw-in/out switch.

According to the present embodiments, it is possible to more quickly and stably perform telescoping for adjusting the axial length of the vehicle steering column and stowing for drawing the steering wheel into or out of the dashboard.

According to the present embodiments, it is possible to secure a space while drawing in/out the vehicle steering column and the steering wheel, provide a convenient space for the driver by increasing the drawing-in/out length, and quickly and stably perform drawing-in/out operation to provide convenience to the driver.

DESCRIPTION OF DRAWINGS

The above and other objects, features, and advantages of the disclosure will be more clearly understood from the following detailed description, taken in conjunction with the accompanying drawings, in which.

DETAILED DESCRIPTION

Figure 1:
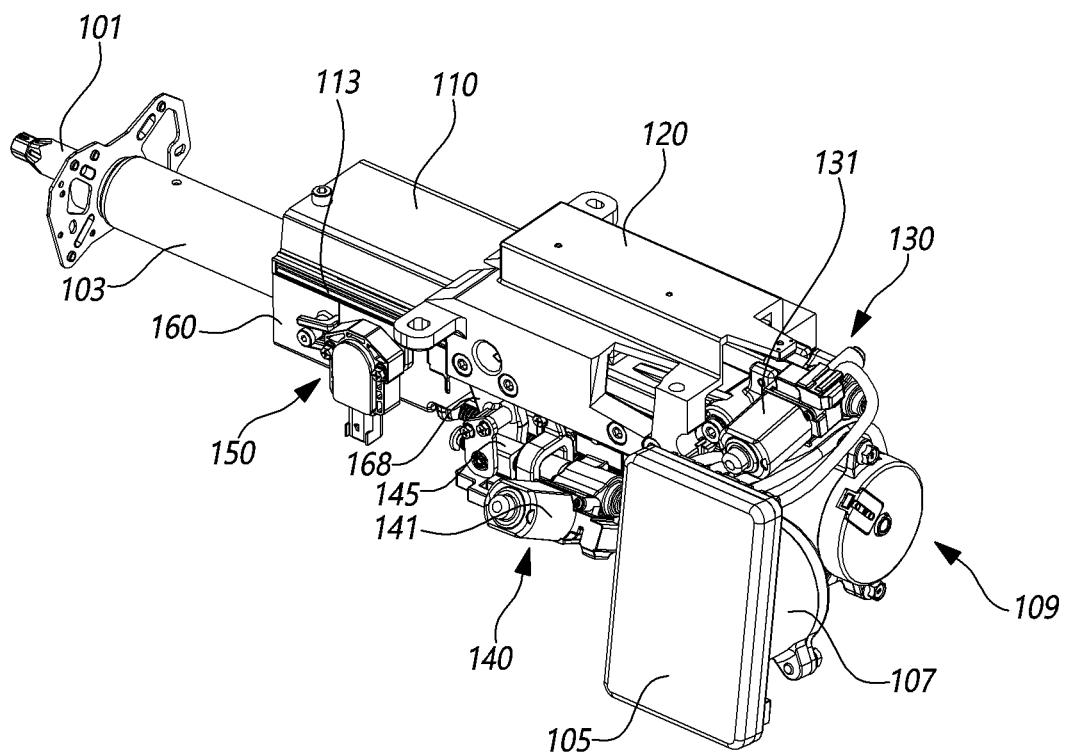
FIG. 1 is a perspective view illustrating a vehicle steering column according to the present embodiments.

In the following description of examples or embodiments of the disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the disclosure, detailed descriptions of well-known functions and components incorporated herein will be omitted when it is determined that the description may make the subject matter in some embodiments of the disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified.

Further, the term "may" fully encompasses all the meanings of the term "can".

Figure 2:
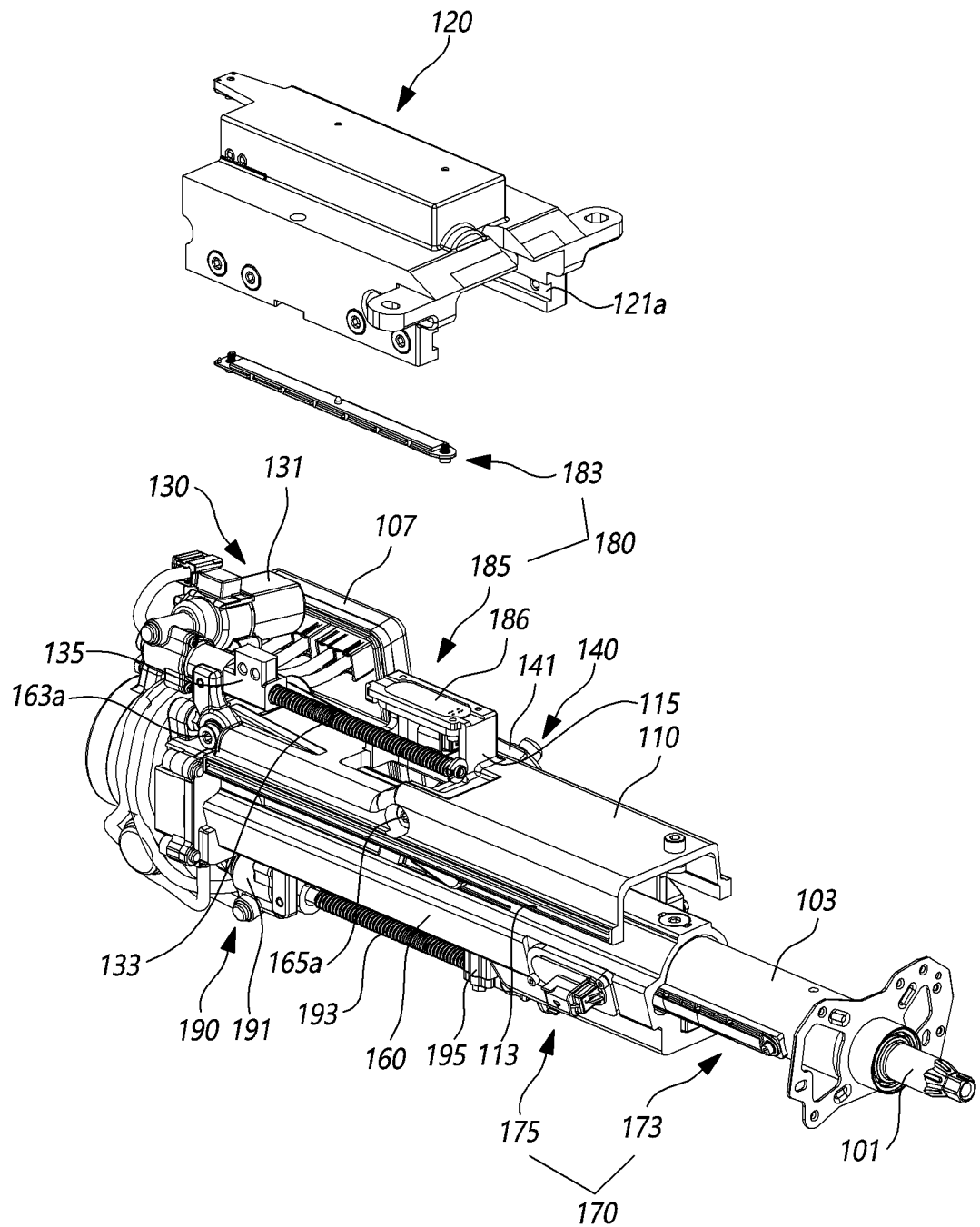
FIG. 2 is an exploded perspective view illustrating a vehicle steering column according to the present embodiments.
Figure 3:
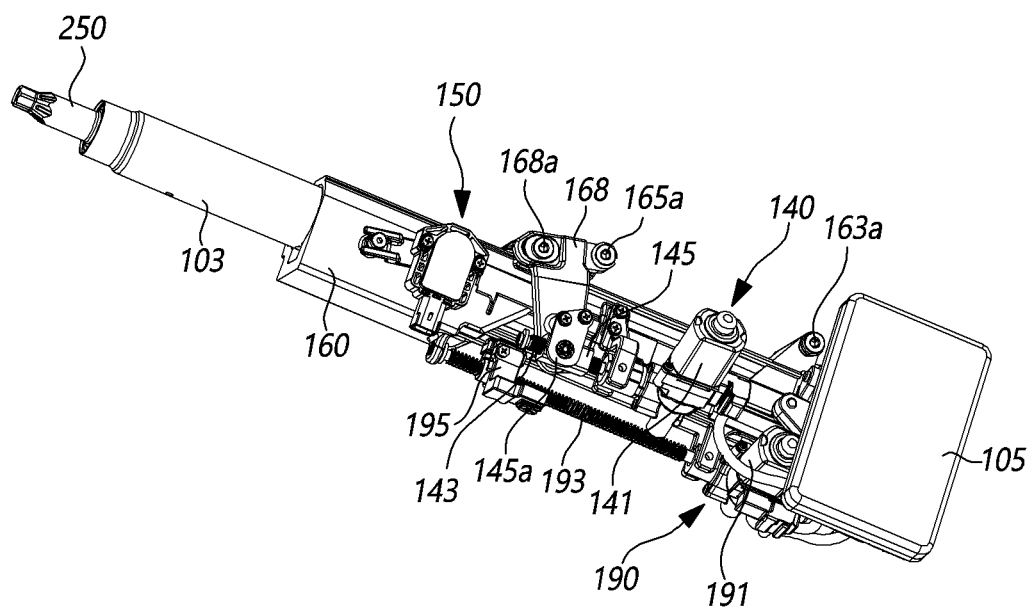
FIG. 3 is a perspective view illustrating a vehicle steering column according to the present embodiments.
Figure 4:
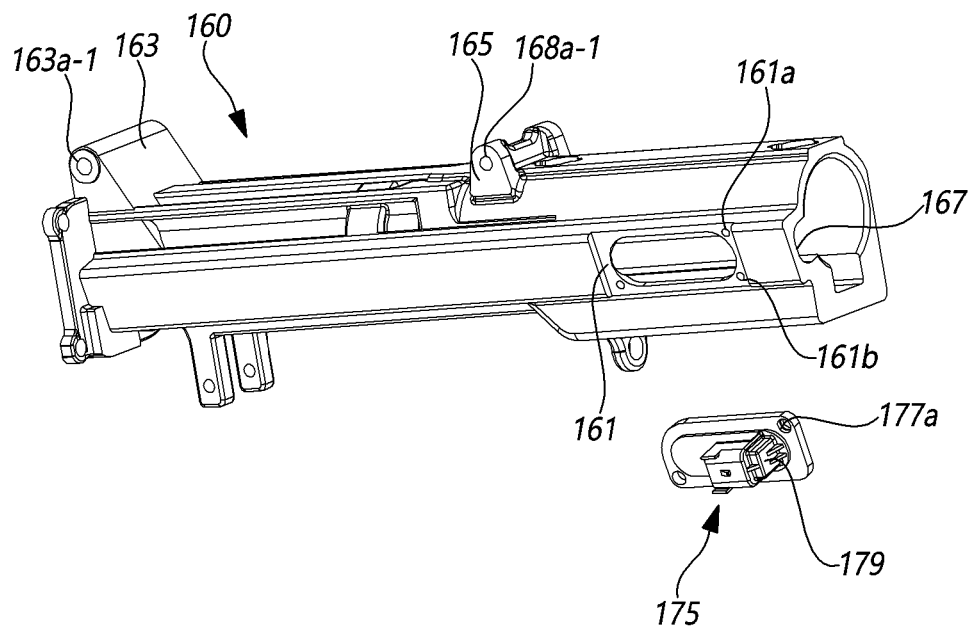
FIG. 4 is an exploded perspective view illustrating a vehicle steering column according to the present embodiments.
Figure 5:
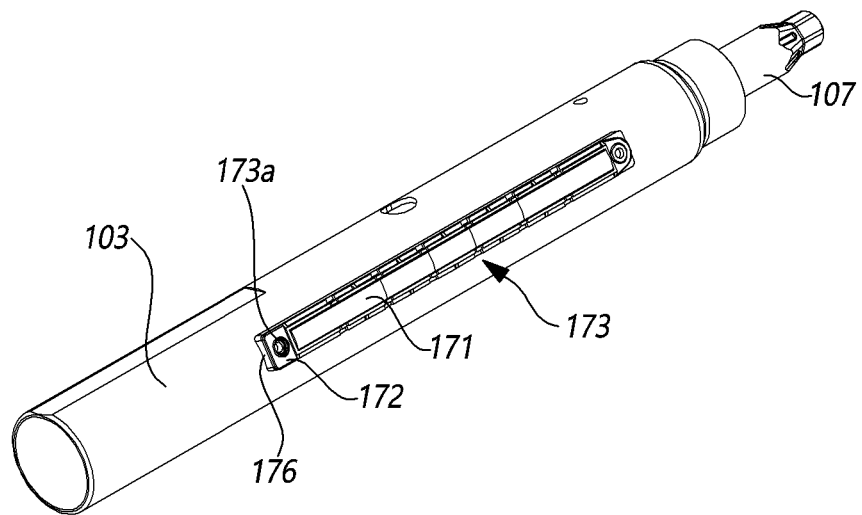
FIG. 5 is a perspective view illustrating a vehicle steering column according to the present embodiments.
Figure 6:
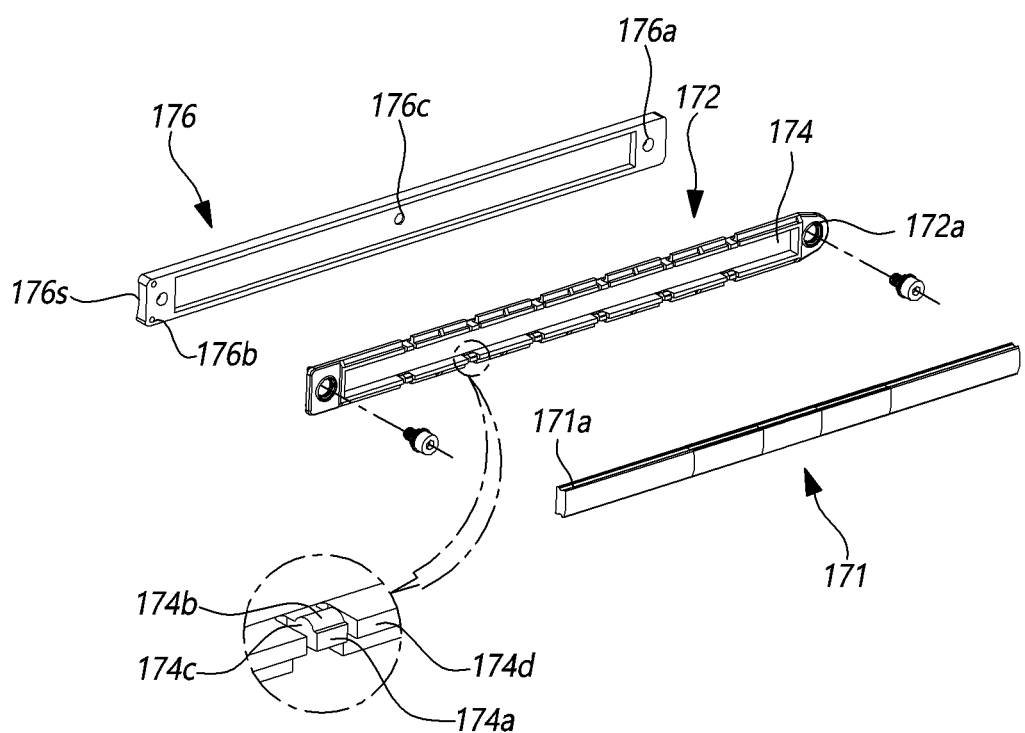
FIGS. 6, 7, 8, 9, and 10 are exploded perspective views illustrating a vehicle steering column according to the present embodiments.
Figure 7:
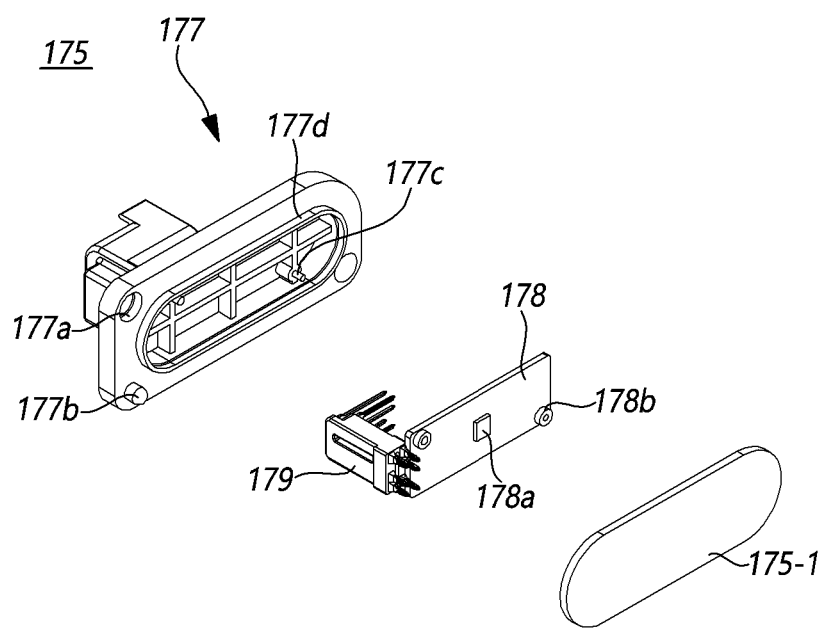
Figure 8:
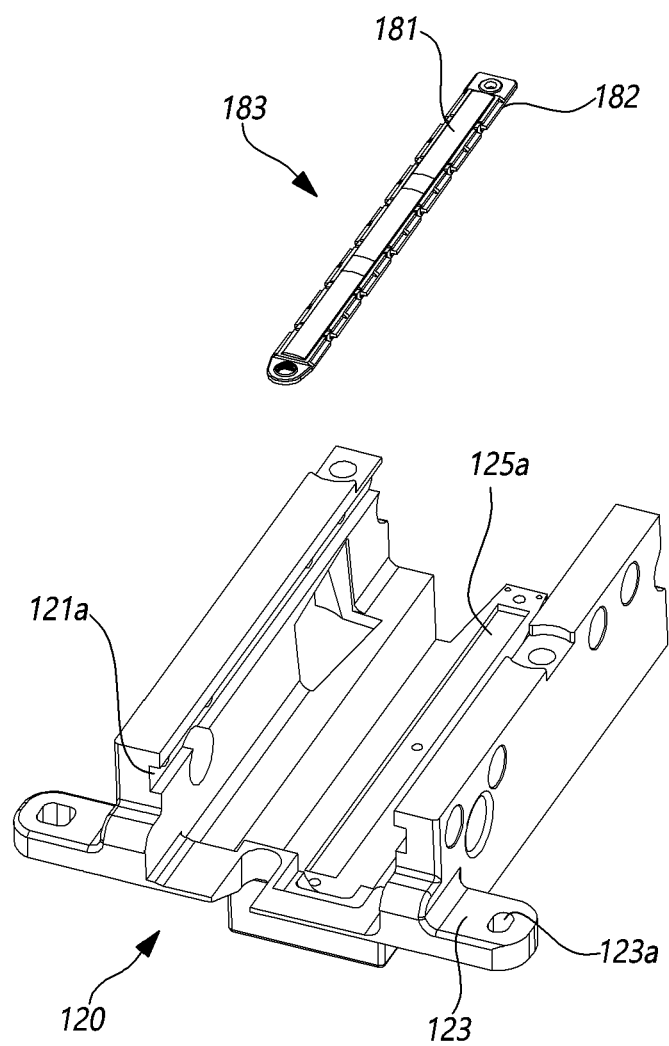
Figure 9:
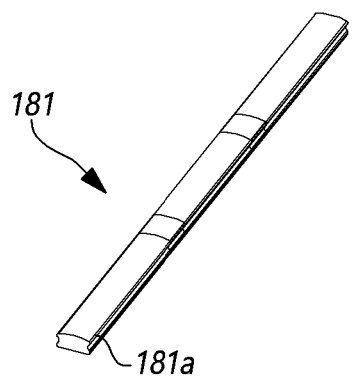
Figure 9:
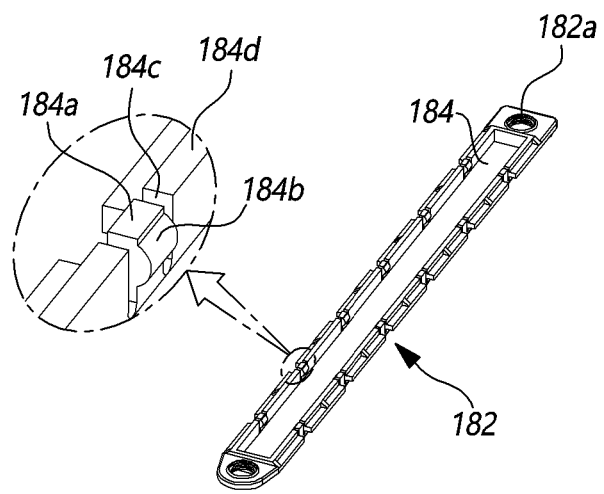
Figure 10:
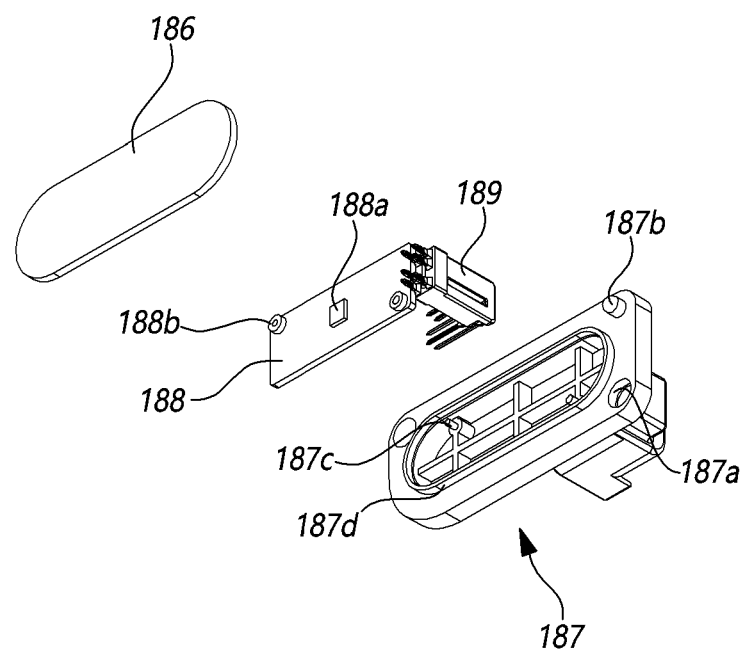
Figure 11:
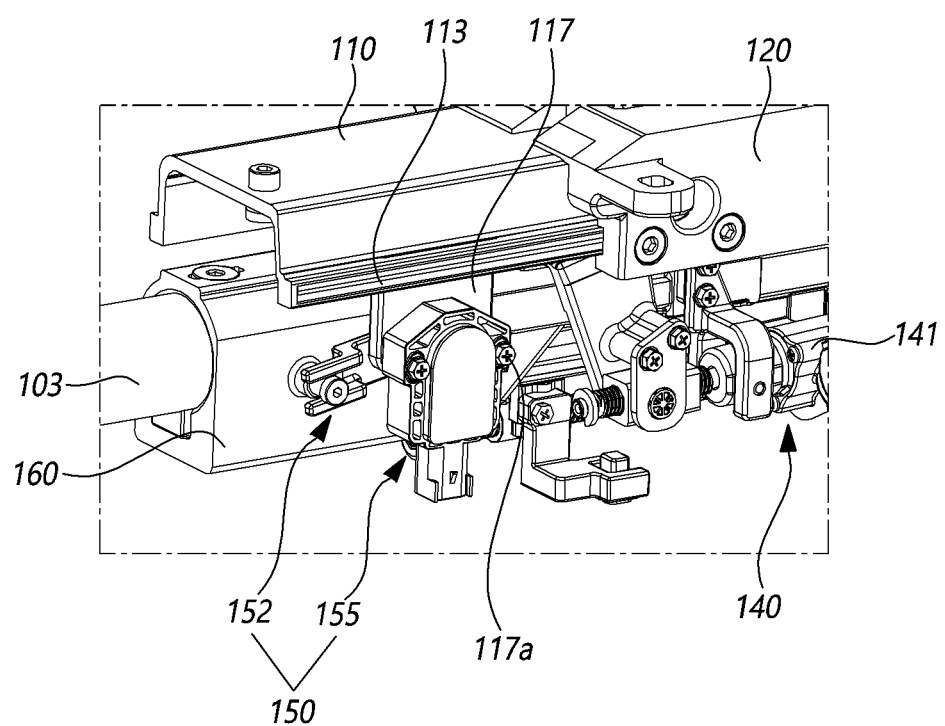
FIG. 11 is a perspective view illustrating a vehicle steering column according to the present embodiments.
Figure 12:
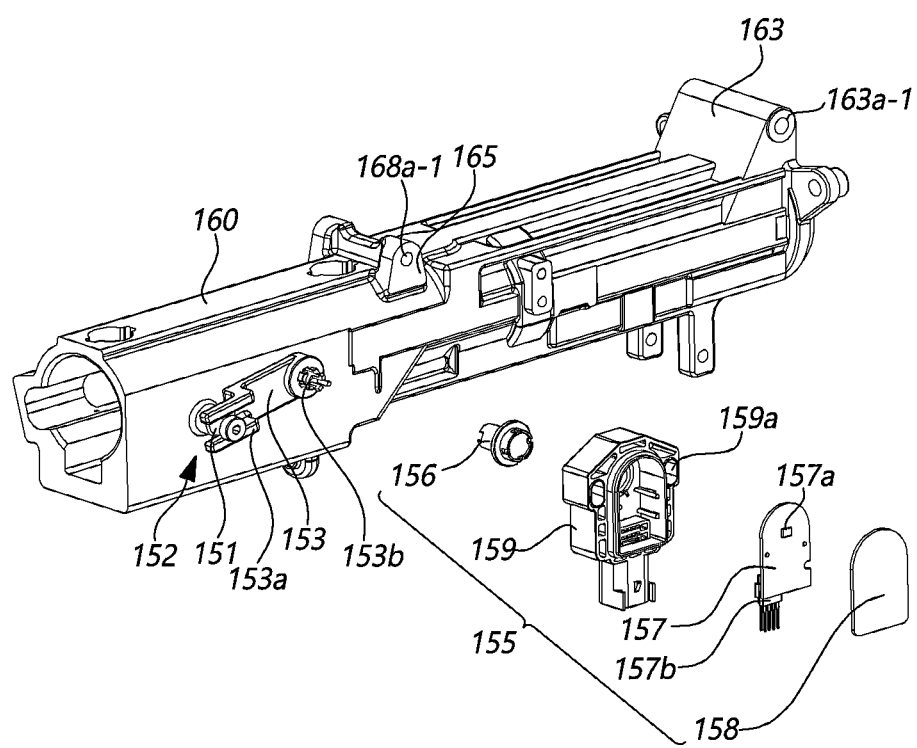
FIG. 12 is an exploded perspective view illustrating a vehicle steering column according to the present embodiments.
Figure 13:
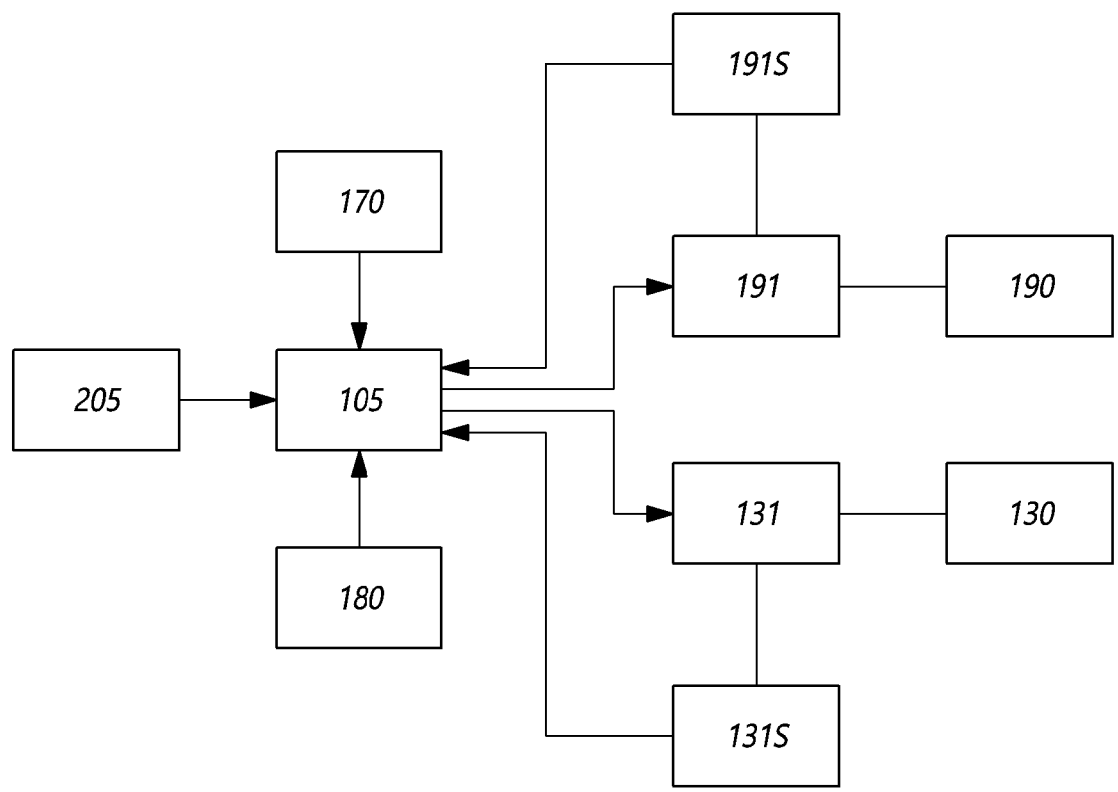
FIGS. 13 and 14 are configuration views illustrating control operations of a vehicle steering column according to the present embodiments.
Figure 14:
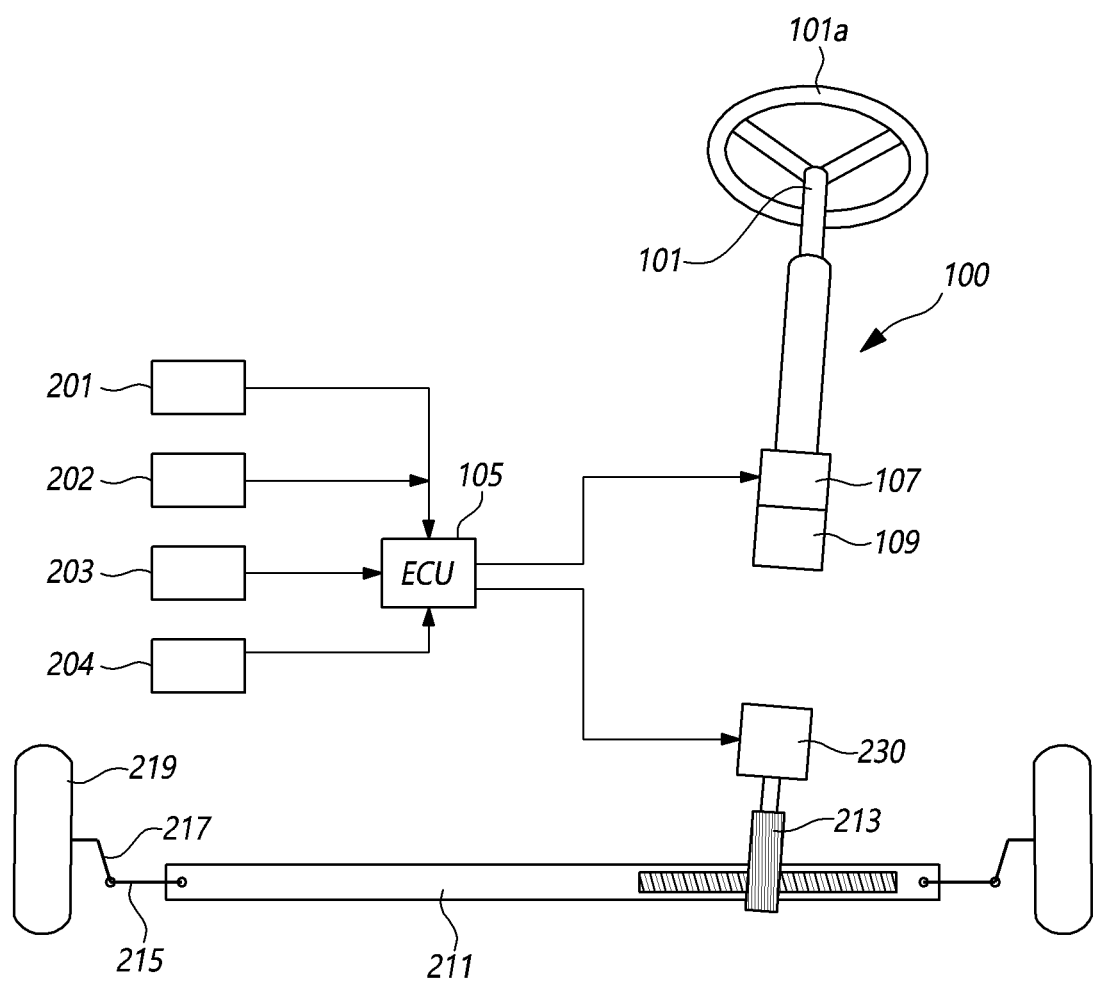

FIG. 1 is a perspective view illustrating a vehicle steering column according to the present embodiments. FIG. 2 is an exploded perspective view illustrating a vehicle steering column according to the present embodiments. FIG. 3 is a perspective view illustrating a vehicle steering column according to the present embodiments. FIG. 4 is an exploded perspective view illustrating a vehicle steering column according to the present embodiments. FIG. 5 is a perspective view illustrating a vehicle steering column according to the present embodiments. FIGS. 6, 7, 8, 9, and 10 are exploded perspective views illustrating a vehicle steering column according to the present embodiments. FIG. 11 is a perspective view illustrating a vehicle steering column according to the present embodiments; FIG. 12 is an exploded perspective view illustrating a vehicle steering column according to the present embodiments. FIGS. 13 and 14 are configuration views illustrating control operations of a vehicle steering column according to the present embodiments.

In the following embodiments and FIGS. 1 to 14, 'upper side' denotes a direction toward the steering wheel 101*a*, and 'lower side' denotes the opposite direction. 'Draw in' denotes moving the steering wheel 101*a* to the lower side to reduce the axial length of the steering column 100, and 'draw out' denotes moving the steering wheel 101*a* to the upper side to increase the axial length of the steering column 100. The direction for drawing in/out may be referred to as an axial direction.

A vehicle steering column 100 according to the present embodiments includes a first moving member 110 slidably coupled to a mounting bracket 120 to be axially moved by a first actuator 130 while being supported on the mounting bracket 120, a tilt bracket 168 having a first side end rotatably coupled to the first moving member 110 and a second side end rotatably coupled to an intermediate member 160 a second moving member 103 having an inner side rotatably coupled with a steering shaft 101 and an outer side slidably coupled with the intermediate member 160 to be axially moved by a second actuator 190 while being supported on the intermediate member 160, and a first position sensor 170 provided on the intermediate member 160 and the second moving member 103 to detect an axial position of the steering shaft 101 and the second moving member 103 with respect to the intermediate member 160.

The mounting bracket 120 has a fixing flange 123 and a fixing hole 123*a* for fixing to the vehicle body so that the steering column 100 is fixed to the vehicle body. The steering wheel 101*a* is coupled to an end of the steering shaft 101 so that the driver's steering is performed.

In the steering column 100 according to these embodiments, the first moving member 110, which has guide portions 113 formed on two opposite sides thereof, is slidably coupled to guide holes 121*a* formed in two opposite inner surfaces of the mounting bracket 120 to be drawn in/out in the axial direction. The guide portions 113 are formed by protruding from two outer surfaces of the first moving member 110 along the axial direction when the two outer surfaces face opposite directions. The guide holes 121*a* are formed by recessing from the two inner surfaces of the mounting bracket 120.

A second moving member 103, which is formed as a hollow and allows the steering shaft 101 to be rotatably coupled thereinside, is inserted into an intermediate member 160 which has a hollow shape so that drawing-in/out motion of the second moving member 103 is performed in the axial direction.

In the present embodiments, the drawing-in/out motion includes telescoping for adjusting the length of the steering column 100 and stowing for drawing the steering wheel 101*a* into or out of the dashboard.

At one side end (i.e., the lower side end) of the intermediate member 160, a tilt shaft coupling hole 163*a*-1 is formed in a tilt coupling portion 163 such that the intermediate member 160 is rotatably coupled to the first moving member 110 and the tilt shaft 163*a*. At another side of the intermediate member 160, a hinge shaft coupling hole 168*a*-1 is formed to be rotatably coupled to the tilt bracket 168 and the hinge shaft 168*a*.

One end of the tilt bracket 168 is rotatably coupled to the first moving member 110 via the bracket shaft 165*a*, and the other end of the tilt bracket 168 is rotatably coupled to the intermediate member 160 via the hinge shaft 168a. The tilt bracket 168 is rotated by a tilt actuator.

The tilt actuator 140 includes a tilt motor 141 that generates a driving force with electrical energy, a tilt screw bar 143 rotated by the tilt motor 141, and a tilt nut 145 coupled to the tilt screw bar 143.

The tilt motor 141 rotates the tilt screw bar 143, and accordingly, the tilt nut 145 coupled to the tilt bracket 168 moves in the axial direction. Thus, the tilt bracket 168 is rotated about the tilt shaft 163a while tilt rotation of the intermediate member 160 is performed.

Accordingly, the intermediate member 160 may perform a tilt function of performing rotation about the first moving member 110 via the tilt bracket 168 along with the first moving member 110.

The first moving member 110 is axially drawn in and out while being supported on the mounting bracket 120 by the first actuator 130, and the second moving member 103 is axially drawn in and out while being supported on the intermediate member 160 by the second actuator 190.

The first position sensor 170 is provided in the intermediate member 160 and the second moving member 103 to detect the axial position of the second moving member 103 with respect to the intermediate member 160 and transmit the detected position to the electronic control unit 105.

Specifically, the first position sensor 170 may include a first magnet assembly 173 provided in the second moving member 103 and the first sensor assembly 175 provided in the intermediate member 160.

The first magnet assembly 173 includes a housing cover 176 having a seating surface 176s seated on an outer circumferential surface of the second moving member 103, a first magnet housing 172 coupled to the housing cover 176, and a first magnet 171 coupled to the first magnet housing 172. The first sensor assembly 175 detects a change in the magnetic field of the first magnet 171.

The housing cover 176, the first magnet housing 172, and the first magnet 171 are generally in a rectangular shape elongated in the axial direction. The direction indicating the width of the rectangular shape of the housing cover 176, the first magnet housing 172, and the first magnet 171 may be referred to as the first sensor width direction.

The first sensor assembly 175 is located radially outward than the first magnet assembly 173 with respect to the second moving member 103. The direction from the first magnet assembly 173 toward the first sensor assembly 175 and the direction from the first sensor assembly 175 toward the first magnet assembly 173 may be collectively referred to as a first sensor height direction.

The housing cover 176 has a seating surface 176s formed in the same curved surface as the outer circumferential surface of the second moving member 103 and is seated on the outer circumferential surface of the second moving member 103. Fixing holes 176a are provided in two opposite axial ends of the housing cover 176 for being coupled to the second moving member 103 as well as the first magnet housing 172.

Further, the housing cover 176 has fixing recesses 176b and 176c on its upper surface to be coupled to a fixing protrusion (not shown) of the first magnet housing 172. The fixing recesses 176b and 176c are formed by recessing from the housing cover 176's upper surface and the fixing protrusion of the first magnet housing 172 is formed by protruding from the first magnet housing 172's lower surface, in the first sensor height direction. The first magnet housing 172 is fixed to the housing cover 176 by coupling between the fixing recesses 176b, 176c and the fixing protrusion of the first magnet housing 172.

The first magnet housing 172, to which the first magnet 171 is inserted and fixed, may include a first body 174 and a first magnet insertion portion 174d. The first body 174 has a fastening hole 172a to which the housing cover 176 is coupled. The first magnet insertion portion 174d is formed as a barrier rib protruding from one side surface of the first body 174 to allow the first magnet 171 to be inserted therein and has a first magnet support 174a protruding to the inner surface of the barrier rib to support a side surface of the first magnet 171.

The first body 174 is coupled and fixed to the housing cover 176. The first magnet insertion portion 174d is formed on one side of the first body 174. In the first magnet insertion portion 174d, the barrier ribs are connected to each other and surround the inner side of the first body 174 in a rectangular shape.

The first magnet insertion portion 174d has a first magnet support 174a formed to protrude in the first sensor width direction toward the inner surface of the barrier rib so that the first magnet 171 may be inserted and fixed.

Further, a supporting recess 171a where the first magnet support 174a is supported is provided in a side surface of the first magnet 171. Specifically, the supporting recess 171a may be formed by recessing in the first sensor width direction from two opposite side surfaces of the first magnet 171. The first magnet support 174a is inserted into and fixed in the supporting recess 171a such that the first magnet 171 is not separated even if an impact is transferred from the outside during driving of the vehicle.

Further, the inner surface 174b of the first magnet support 174a may be formed as a convex curved surface, and the supporting recess 171a may be formed as a concave curved surface into which the first magnet support 174a is inserted, so that the first magnet 171 is easily assembled while preventing the first magnet 171 from being separated.

The lower end of the first magnet support 174a is connected to the first body 174, and the two opposite side surfaces 174c are cut to be spaced apart from the first magnet insertion portion 174d, so that when the first magnet 171 is inserted, the first magnet support 174a is elastically deformed and assembled, and if the insertion of the first magnet 171 is completed, the first magnet 171 is fixed while being supported in place in the supporting recess.

The first sensor assembly 175 may include a first printed circuit board 178, a first board fixing member 175-1, and a first sensor housing 177. On the first printed circuit board 178, a first sensor 178a for detecting a change in the magnetic field of the first magnet 171 is mounted. The first board fixing member 175-1 is seated on a stepped portion 161 formed around a through hole provided in the intermediate member 160. On the first board fixing member 175-1, the first printed circuit board 178 is mounted. The first sensor housing 177 is coupled to the stepped portion 161 while surrounding the first board fixing member 175-1 and a first terminal portion 179 coupled to the first printed circuit board 178.

The first sensor 178a is mounted on the first printed circuit board 178 to detect a change in the magnetic field of the first magnet 171 when the second moving member 103 moves in the axial direction. The first sensor 178a is coupled with the first terminal portion 179 connected with a power supply unit and the electronic control unit 105.

The first printed circuit board 178 has a fastening portion 178b for coupling with the first sensor housing 177 via the fastening protrusion 177c of the first sensor housing 177. The fastening portion 178b is formed by protruding from the first printed circuit board 178's bottom surface such that providing a space between the first printed circuit board 178, which includes the first sensor 178a, and the first board fixing member 175-1.

The first sensor housing 177 has a communication hole 177a communicating with the fastening hole 161a formed in the stepped portion 161 of the intermediate member 160 to allow the fastening member to be coupled thereto, and a fixing protrusion 177b coupled to the fixing hole 161b formed in the stepped portion 161. The first board fixing member 175-1 is inserted and fixed to the coupling protrusion 177d of the first sensor housing 177.

In the present embodiments, a second position sensor 180 may be further included which is provided between the mounting bracket 120 and the first moving member 110 to detect the axial position of the first moving member 110 with respect to the mounting bracket 120.

The second position sensor 180 detects the axial position of the first moving member 110 with respect to the mounting bracket 120 and transmits the axial position of the first moving member 110 to the electronic control unit 105.

The second position sensor 180 may include a second magnet assembly 183 and a second sensor assembly 185. The second magnet assembly 183 includes a second magnet housing 182 inserted and fixed to the fixing recess 125a provided in an inner surface of the mounting bracket 120 and a second magnet 181 coupled to the second magnet housing 182. The second sensor assembly 185 is provided on an outer surface of the first moving member 110 to detect a change in the magnetic field of the second magnet 181.

The second magnet housing 182 and the second magnet 181 are generally in a rectangular shape elongated in the axial direction.

The direction indicating the width of the rectangular shape of the second magnet housing 182 and the second magnet 181 may be referred to as the second sensor width direction.

The direction from the second magnet assembly 183 toward the second sensor assembly 185 and the direction from the second sensor assembly 185 toward the second magnet assembly 183 may be collectively referred to as a second sensor height direction.

The second magnet housing 182 may include a second body 184 and a second magnet insertion portion 184d. The second body 184 is coupled to the fixing recess 125a of the mounting bracket 120. The second magnet insertion portion 184d is formed as a barrier rib protruding from one side surface of the second body 184 to allow the second magnet 181 to be inserted thereto and has a second magnet support 184a protruding to the inner surface of the barrier rib to support a side surface of the second magnet 181.

The second body 184 is inserted and fixed to the fixing recess 125a formed in the mounting bracket 120. The second magnet insertion portion 184d is formed on one side of the second body 184. In the second magnet insertion portion 184d, the barrier ribs are connected to each other and surround the inner side of the second body 184 in a rectangular shape.

The second magnet insertion portion 184d has a second magnet support 184a formed to protrude in the second sensor width direction toward the inner surface of the barrier rib so that the second magnet 181 may be inserted and fixed.

Further, a supporting recess 181a where the second magnet support 184a is supported is provided in a side surface of the second magnet 181. Specifically, the supporting recess 181a may be formed by recessing in the second sensor width direction from two opposite side surfaces of the second magnet 181. The second magnet support 184a is inserted into and fixed in the supporting recess 181a such that the second magnet 181 is not separated even if an impact is transferred from the outside during driving of the vehicle.

Further, the inner surface 184b of the second magnet support 184a may be formed as a convex curved surface, and the supporting recess 181a may be formed as a concave curved surface into which the second magnet support 184a is inserted, so that the second magnet 181 is easily assembled while preventing the second magnet 181 from being separated.

The lower end of the second magnet support 184a is connected to the second body 184, and the two opposite sides are cut to be spaced apart from the second magnet insertion portion 184d, so that when the second magnet 181 is inserted, the second magnet support 184a is elastically deformed and assembled, and if the assembly of the second magnet 181 is completed, the second magnet 181 is fixed while being supported in place in the supporting recess 181.

The second sensor assembly 185 may include a second printed circuit board 188, a second board fixing member 186, and a second sensor housing 187. On the second printed circuit board 188, a second sensor 188a for detecting a change in the magnetic field of the second magnet 181 is mounted. The second board fixing member 186 is seated on a sensor mounting portion 115 provided in the first moving member 110. On the second board fixing member 186, the second printed circuit board 188 is mounted. The second sensor housing 187 is coupled to the sensor mounting portion 115 while surrounding the second board fixing member 186 and a second terminal portion 189 coupled to the second printed circuit board 188.

The second sensor 188a is mounted on the second printed circuit board 188 to detect a change in the magnetic field of the second magnet 181 when the first moving member 110 moves in the axial direction. The second sensor 188a is coupled with the second terminal portion 189 connected with a power supply unit and the electronic control unit 105.

The second printed circuit board 188 has a fastening portion 188b for coupling with the second sensor housing 187 via the fastening protrusion 187c of the second sensor housing 187. The fastening portion 188b is formed by protruding from the second printed circuit board 188's bottom surface such that a space is provided between the second printed circuit board 188, which includes the second sensor 188a, and the second board fixing member 186.

The second sensor housing 187 has a communication hole 187a communicating with a fastening hole (not shown) formed in the sensor mounting portion 115 of the first moving member 110 to allow the fastening member to be coupled thereto, and a fixing protrusion 187b coupled to a fixing hole (not shown) formed in the sensor mounting portion 115.

In the present embodiments, a tilt rotational angle sensor 150 may be further included which is provided in the first moving member 110 and the intermediate member 160 to detect the tilt angle of the intermediate member 160.

The tilt rotational angle sensor 150 detects the tilt angle of the intermediate member 160 with respect to the first moving member 110 and transmits the detected tilt angle to the electronic control unit 105.

The tilt rotational angle sensor 150 may include a lever assembly 152 provided in the intermediate member 160 and a rotational angle sensor assembly 155 provided in the first moving member 110 to detect the rotational angle of the lever assembly 152.

The lever assembly 152 may include a protruding member 151 and a supporting lever 153. The protruding member 151 is provided by protruding from an outer surface of the intermediate member 160. The supporting lever 153 has a first support 153a rotatably coupled to the protruding member 151 at one end thereof and a second support 153b rotatably coupled to the rotational angle sensor assembly 155 at the other end thereof.

The protruding member 151 is provided on the outer surface of the intermediate member 160 and may be integrally formed with the intermediate member 160 or may be formed by coupling a separate protruding member 151 to the outer circumferential surface of the intermediate member 160. In the present embodiments, the shape in which the separate protruding member 151 is coupled is illustrated as an example.

The first side end and the second side end of the supporting lever 153 may be formed to be stepped. The first support 153a may be provided at the first end to support the facing outer circumferential surface of the protruding member 151. This design ensures that when the intermediate member 160 is tilt-rotated, it can rotate while the first support 153a supports the protruding member 151.

The second support 153b rotatably coupled to the rotational angle sensor assembly 155 fixed to the first moving member 110 is provided at the second end of the supporting lever 153, so that when the intermediate member 160 is tilt-rotated, the supporting lever 153 is rotated about the second support 153b as its rotation axis, and the rotational angle of the second support 153b may be detected by the rotational angle sensor assembly 155.

The rotational angle sensor assembly 155 may include a rotating member 156 coupled to the second support 153b to rotate, a printed circuit board 157 on which a sensor 157a for detecting a rotational angle of the rotating member 156 is mounted, a board fixing member 158 on which the printed circuit board 157 is mounted, and a sensor housing 159 coupled to the first moving member 110 while surrounding the board fixing member 158 and a terminal portion 157b coupled to the printed circuit board 157.

The rotating member 156 is designed to rotate in coordination with the second support 153b when the second support 153b rotates and the rotating member 156 is rotatably supported by the sensor housing 159. The rotating member has a magnet (not shown) embedded therein. This configuration allows the sensor 157a, which is mounted on the printed circuit board 157, to detect changes in the magnetic field and thereby determine the rotational angle of the rotating member 156.

The printed circuit board 157 has the sensor 157a mounted thereon to detect the rotational angle of the rotating member 156 and is coupled with the terminal portion 157b connected with the power source unit and the electronic control unit 105. The printed circuit board 157 is mounted to the board fixing member 158 and coupled to the sensor housing 159.

A fastening hole 159a is formed in the sensor housing 159 to be coupled to the mounting flange 117 of the first moving member 110 by the fastening member 117a.

Referring to FIGS. 13 and 14 together with FIGS. 1 to 12, a vehicle steering column 100 according to the present embodiments may include a first moving member 110 slidably coupled to a mounting bracket 120 to be axially moved while being supported on the mounting bracket 120 by a first actuator 130, a tilt bracket 168 having a first side end rotatably coupled to the first moving member 110 and a second side end rotatably coupled to an intermediate member 160, a second moving member 103 having an inner side rotatably coupled with a steering shaft 101 and an outer side slidably coupled with the intermediate member 160 to be axially moved while being supported on the intermediate member 160 by a second actuator 190, a first position sensor 170 provided on the intermediate member 160 and the second moving member 103 to detect an axial position of the steering shaft 101 and the second moving member 103 with respect to the intermediate member 160, a second position sensor 180 provided on the mounting bracket 120 and the first moving member 110 to detect an axial position of the first moving member 110 with respect to the mounting bracket 120, and an electronic control unit controlling operation of the first actuator 130 and the second actuator 190 according to a draw-in signal value or a draw-out signal value of a draw-in/out switch 205 manipulated by a driver and a position value received from the first position sensor 170 and the second position sensor 180.

Here, the first moving member 110, the intermediate member 160, the second moving member 103, the first position sensor 170, and the second position sensor 180 are the same as those described above, and thus a detailed description thereof will be omitted.

The first actuator 130 includes a first motor 131 generating a driving force with electrical energy, a first screw bar 133 rotated by the first motor 131, a first screw nut 135 coupled to the first screw bar 133, and a first current sensor 131S detecting the amount of current of the first motor 131.

The first motor 131 controlled by the electronic control unit 105 rotates the first screw bar 133, and accordingly, the first screw nut 135 coupled to the first moving member 110 moves in the axial direction, thereby drawing in or out the first moving member 110.

The second actuator 190 includes a second motor 191 generating a driving force with electrical energy, a second screw bar 193 rotated by the second motor 191, a second screw nut 195 coupled to the second screw bar 193, and a second current sensor 191S detecting the amount of current of the second motor 191.

The second motor 191 controlled by the electronic control unit 105 rotates the second screw bar 193, and accordingly, the second screw nut 195 coupled to the second moving member 103 moves in the axial direction, thereby drawing in or out the second moving member 103.

The electronic control unit 105 controls the operation of the first actuator 130 and the second actuator 190 according to the draw-in signal value or the draw-out signal value of the draw-in/out switch 205 manipulated by the driver and the position values received from the first position sensor 170 and the second position sensor 180.

The electronic control unit 105 determines whether to operate the first motor 131 and the second motor 191 based on inputs received from the driver, which includes the draw-in signal value or the draw-out signal value input. This determination is made by using various data including the maximum drawn-in position value and the maximum drawn-out position value of the first moving member 110, the maximum drawn-in position value and the maximum drawn-out position value of the second moving member 103, the amount of operating current of the first motor 131, and the amount of operating current of the second motor 191.

According to the determination, the first motor 131 and the second motor 191 may be operated simultaneously or only one thereof may be operated. In an emergency, such as when the driver's body is stuck between the dashboard and the steering wheel 101a or the steering wheel 101a pushes out the driver's body with excessive force during the draw-in/out motion, control may be performed to move in the direction opposite to the operating direction.

In other words, when the draw-in signal value is received from the draw-in/out switch 205, if the amount of current of the first motor 131 detected by the first current sensor 131S is greater than preset data, the electronic control unit 105 may stop the operation of the first motor 131 and operate the second motor 191 in the direction of drawing out the second moving member 103.

In this case, the electronic control unit 105 may determine that the driver's body part is stuck between the dashboard and the steering wheel 101a during the draw-in motion so that excessive torque is generated in the first motor 131 and may thus stop operation of the first motor 131 and operate the second motor 191 in the direction of drawing out the second moving member 103, securing a space between the steering wheel 101a and the dashboard.

Further, when the draw-in signal value is received from the draw-in/out switch 205, if the amount of current of the second motor 191 detected by the second current sensor 191S is greater than preset data, the electronic control unit 105 may stop the operation of the second motor 191 and operate the first motor 131 in the direction of drawing out the first moving member 110.

Also in this case, the electronic control unit 105 may determine that the driver's body part is stuck between the dashboard and the steering wheel 101a during the draw-in motion so that excessive torque is generated in the second motor 191 and may thus stop operation of the second motor 191 and operate the first motor 131 in the direction of drawing out the first moving member 110, securing a space between the steering wheel 101a and the dashboard.

Further, when the draw-out signal value is received from the draw-in/out switch 205, if the amount of current of the first motor 131 detected by the first current sensor 131S is greater than preset data, the electronic control unit 105 may stop the operation of the first motor 131 and operate the second motor 191 in the direction of drawing in the second moving member 103.

In this case, the electronic control unit 105 may determine that the steering wheel 101a pushes out the driver's body with excessive force so that excessive torque is generated in the first motor 131 and may thus stop operation of the first motor 131 and operate the second motor 191 in the direction of drawing in the second moving member 103, securing a space between the steering wheel 101a and the driver's body.

Further, when the draw-out signal value is received from the draw-in/out switch 205, if the amount of current of the second motor 191 detected by the second current sensor 191S is greater than preset data, the electronic control unit 105 may stop the operation of the second motor 191 and operate the first motor 131 in the direction of drawing in the first moving member 110.

Also in this case, the electronic control unit 105 may determine that the steering wheel 101a pushes out the driver's body with excessive force so that excessive torque is generated in the second motor 191 and may thus stop operation of the second motor 191 and operate the first motor 131 in the direction of drawing in the first moving member 110, securing a space between the steering wheel 101a and the driver's body.

Therefore, even in an emergency, such as when the driver's body is stuck between the dashboard and the steering wheel 101a or the steering wheel 101a pushes out the driver's body with excessive force during the draw-in/out motion of the first moving member 110 and the second moving member 103, the draw-in/out motion in the opposite direction may be performed by the electronic control unit 105, securing the driver's safety and convenience.

The vehicle steering column 100 according to the present embodiments may be applied to a vehicle steering column 100 that is capable of self-driving, as well as a vehicle steering column 100 that is steered by the driver.

Referring to FIG. 14 which illustrates a steer-by-wire steering device capable of self-driving, when the driver manipulates the steering wheel 101a, an angle sensor 201 and a torque sensor 202 are operated to detect the driver's manipulation and send an electrical signal to the electronic control unit 105 to thereby operate the steering wheel motor 107 and the pinion shaft motor 230.

The electronic control unit 105 controls the steering wheel motor 107 and the pinion shaft motor 230 based on the electrical signals transmitted from the angle sensor 201 and the torque sensor 202 and electrical signals transmitted from other various sensors mounted to the vehicle.

The steering wheel motor 107 is connected to a reducer (not shown) for reducing the number of rotations of the motor. In normal driving, the steering wheel motor 107 provides a reaction force or counteracting force to the steering wheel 101a, allowing the driver to perceive a resistance force in the opposite direction when manipulating the steering wheel 101a. In autonomous driving, steering is performed under the control of the electronic control unit 105 without the driver's involvement.

The pinion shaft motor 230 may slide the rack bar 211 connected to the pinion shaft 213 to steer the wheels 219 on two opposite sides through the tie rods 215 and the knuckle arms 217.

Although FIG. 14 illustrates an example in which an angle sensor 201, a torque sensor 202, a vehicle velocity sensor 203, and a wheel rotational angle sensor 204 for transmitting steering information to the electronic control unit 105, are provided for convenience of description, other sensors such as a motor position sensor, various radars or lidars, or image sensors, such as cameras, may further be provided, which are not described in detail.

In such a steer-by-wire steering device, since the steering wheel 101a and the wheel 219 are not mechanically connected to each other, a mechanical limitation is required to stop the rotation of the steering wheel 101a at a predetermined angle when the steering wheel 101a is operated by the driver.

Accordingly, a rotational angle limiting member 190 may be provided to mechanically limit the rotational angle of the steering wheel 101a to stop the steering wheel 101a from further rotation when the rotation of the wheel 119 reaches the maximum point (when the steering wheel 101a or the wheel 119 is in a full-turn state in the general steering device).

According to the present embodiments, it is possible to more quickly and stably perform telescoping for adjusting the axial length of the vehicle steering column and stowing for drawing the steering wheel into or out of the dashboard.

According to the present embodiments, it is possible to secure a space while drawing in/out the vehicle steering column and the steering wheel, provide a convenient space for the driver by increasing the drawing-in/out length, and quickly and stably perform drawing-in/out operation to provide convenience to the driver.

The above description has been presented to enable any person skilled in the art to make and use the technical idea of the disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the disclosure. Also, it is noted that any one feature of an embodiment of the present disclosure described in the specification may be applied to another embodiment of the present disclosure. The above description and the accompanying drawings provide an example of the technical idea of the disclosure for illustrative purposes only. That is, the disclosed embodiments are intended to illustrate the scope of the technical idea of the disclosure. Thus, the scope of the disclosure is not limited to the embodiments shown, but is to be accorded the widest scope consistent with the claims. The scope of protection of the disclosure should be construed based on the following claims, and all technical ideas within the scope of equivalents thereof should be construed as being included within the scope of the disclosure.

What is claimed:

1. A vehicle steering column, comprising:
   a first moving member slidably coupled to a mounting bracket to be axially moved by a first actuator while being supported on the mounting bracket;
   a tilt bracket having a first side end rotatably coupled to the first moving member and a second side end rotatably coupled to an intermediate member;
   a second moving member having an inner side rotatably coupled with a steering shaft and an outer side slidably coupled with the intermediate member to be axially moved by a second actuator while being supported on the intermediate member; and
   a first position sensor provided on the intermediate member and the second moving member to detect an axial position of the steering shaft and the second moving member with respect to the intermediate member.

2. The vehicle steering column of claim 1, wherein the first position sensor includes:
   a first magnet assembly including a housing cover having a seating surface seated on an outer circumferential surface of the second moving member, a first magnet housing coupled to the housing cover, and a first magnet coupled to the first magnet housing; and
   a first sensor assembly provided on the intermediate member to detect a change in a magnetic field of the first magnet.

3. The vehicle steering column of claim 2, wherein the first magnet housing includes:
   a first body having a fastening hole to which the housing cover is coupled; and
   a first magnet insertion portion formed as a barrier rib protruding from one side surface of the first body to allow the first magnet to be inserted therein and having a first magnet support protruding to an inner surface of the barrier rib to support a side surface of the first magnet.

4. The vehicle steering column of claim 3, wherein a lower end portion of the first magnet support is connected to the first body, and wherein two opposite sides of the first magnet support are cut and spaced apart from the first magnet insertion portion.

5. The vehicle steering column of claim 2, wherein the first sensor assembly includes:
   a first printed circuit board on which a first sensor is mounted to detect a change in a magnetic field of the first magnet;
   a first board fixing member allowing the first printed circuit board to be mounted thereon and seated on a stepped portion around a through hole provided in the intermediate member; and
   a first sensor housing coupled to the stepped portion while surrounding the first board fixing member and a first terminal portion coupled to the first printed circuit board.

6. The vehicle steering column of claim 1, further comprising a second position sensor provided on the mounting bracket and the first moving member to detect an axial position of the first moving member with respect to the mounting bracket.

7. The vehicle steering column of claim 6, wherein the second position sensor includes:
   a second magnet assembly including a second magnet housing and a second magnet coupled to the second magnet housing; and
   a second sensor assembly provided on an outer surface of the first moving member to detect a change in a magnetic field of the second magnet.

8. The vehicle steering column of claim 7, wherein the second magnet housing includes:
   a second body inserted and fixed in a fixing recess provided in an inner surface of the mounting bracket; and
   a second magnet insertion portion formed as a barrier rib protruding from one side surface of the second body to allow the second magnet to be inserted therein and having a second magnet support protruding to an inner surface of the barrier rib to support a side surface of the second magnet.

9. The vehicle steering column of claim 8, wherein a lower end portion of the second magnet support is connected to the second body, and wherein two opposite sides of the second magnet support are cut and spaced apart from the second magnet insertion portion.

10. The vehicle steering column of claim 7, wherein the second sensor assembly includes:
    a second printed circuit board on which a second sensor is mounted to detect a change in a magnetic field of the second magnet;
    a second board fixing member allowing the second printed circuit board to be mounted thereon and seated on a sensor mounting portion provided in the first moving member; and
    a second sensor housing coupled to the sensor mounting portion while surrounding the second board fixing member and a second terminal portion coupled to the second printed circuit board.

11. The vehicle steering column of claim 1, further comprising a tilt rotational angle sensor provided in the first moving member and the intermediate member to detect a tilt angle of the intermediate member with respect to the first moving member.

12. The vehicle steering column of claim 11, wherein the tilt rotational angle sensor includes:
    a lever assembly provided in the intermediate member; and
    a rotational angle sensor assembly provided on the first moving member to detect a rotational angle of the lever assembly.

13. The vehicle steering column of claim 12, wherein the lever assembly includes:

a protruding member protruding from an outer surface of the intermediate member; and a supporting lever having a first support rotatably coupled to the protruding member on a first side end and a second support rotatably coupled to the rotational angle sensor assembly on a second side end.

14. The vehicle steering column of claim 12, wherein the rotational angle sensor assembly includes:

a rotating member coupled to a second support to rotate;

a printed circuit board on which a sensor for detecting a rotational angle of the rotating member is mounted;

a board fixing member on which the printed circuit board is mounted; and a sensor housing coupled to the first moving member while surrounding the board fixing member and a terminal portion coupled to the printed circuit board.

15. A vehicle steering column, comprising:

a first moving member slidably coupled to a mounting bracket to be axially moved by a first actuator while being supported on the mounting bracket;

a tilt bracket having a first side end rotatably coupled to the first moving member and a second side end rotatably coupled to an intermediate member;

a second moving member having an inner side rotatably coupled with a steering shaft and an outer side slidably coupled with the intermediate member to be axially moved by a second actuator while being supported on the intermediate member;

a first position sensor provided on the intermediate member and the second moving member to detect an axial position of the steering shaft and the second moving member with respect to the intermediate member;

a second position sensor provided on the mounting bracket and the first moving member to detect an axial position of the first moving member with respect to the mounting bracket; and an electronic control unit controlling operation of the first actuator and the second actuator according to a draw-in signal value or a draw-out signal value of a draw-in/out switch manipulated by a driver and a position value received from the first position sensor and the second position sensor.

16. The vehicle steering column of claim 15, wherein the first actuator includes a first motor and a first current sensor detecting an amount of current of the first motor, and the second actuator includes a second motor and a second current sensor detecting an amount of current of the second motor.

17. The vehicle steering column of claim 16, wherein the electronic control unit stops operation of the first motor and operates the second motor in a direction of drawing out the second moving member if the amount of current of the first motor detected by the first current sensor is greater than preset data when the draw-in signal value is received from the draw-in/out switch.

18. The vehicle steering column of claim 16, wherein the electronic control unit stops operation of the second motor and operates the first motor in a direction of drawing out the first moving member if the amount of current of the second motor detected by the second current sensor is greater than preset data when the draw-in signal value is received from the draw-in/out switch.

19. The vehicle steering column of claim 16, wherein the electronic control unit stops operation of the first motor and operates the second motor in a direction of drawing in the second moving member if the amount of current of the first motor detected by the first current sensor is greater than preset data when the draw-out signal value is received from the draw-in/out switch.

20. The vehicle steering column of claim 16, wherein the electronic control unit stops operation of the second motor and operates the first motor in a direction of drawing in the first moving member if the amount of current of the second motor detected by the second current sensor is greater than preset data when the draw-out signal value is received from the draw-in/out switch.

* * * * *